United States Patent [19]
Groult et al.

[11] Patent Number: 5,800,921
[45] Date of Patent: Sep. 1, 1998

[54] ANTIABRASION CURVED SHAPE AND PROCESS FOR ITS MANUFACTURE

[75] Inventors: Pierre Groult, deceased, late of Etrechy, by Josette Groult, Therese Groult, Maria Santa Groult, Vanina Groult, Henri Groult, Barthelemy Groult, heirs; Michel Huvey, Bougival, both of France

[73] Assignee: Institut Francais du Petrole, Rueil-Malmaison, France

[21] Appl. No.: 200,994

[22] Filed: Feb. 24, 1994

Related U.S. Application Data

[62] Division of Ser. No. 773,412, Oct. 9, 1991, Pat. No. 5,389,424, which is a continuation of Ser. No. 144,915, filed as PCT/FR87/00113 Apr. 3, 1987, abandoned.

[51] Int. Cl.[6] ............................. D02G 3/00; B32B 31/00
[52] U.S. Cl. ..................... 428/369; 428/101; 428/114; 428/174; 428/212; 428/364; 428/370; 428/378; 428/908.8; 156/60; 156/296
[58] Field of Search ........................... 428/174, 156, 428/212, 101, 114, 155, 142, 365, 364, 369, 370, 375, 398, 908.8; 156/60, 290

[56] References Cited

U.S. PATENT DOCUMENTS

| | | | |
|---|---|---|---|
| 2,054,499 | 9/1936 | Florman | 428/167 |
| 2,181,164 | 11/1939 | Alexander | 428/167 |
| 2,253,219 | 9/1941 | Alexander | 428/167 |
| 2,874,754 | 2/1959 | Yust | 428/182 |
| 3,117,902 | 1/1964 | Holzheimer | 428/167 |

*Primary Examiner*—Donald Loney
*Attorney, Agent, or Firm*—Antonelli, Terry, Stout & Kraus, LLP

[57] ABSTRACT

Antiabrasion curved section made of reinforced curved plastic material and comprising in at least one of a lower portion and an upper portion an antiabrasion material. A plurality of antiabrasion sections are produced inside a profiled mold having a plurality of grooves in which is arranged the antiabrasion material of the lower faces. Reinforced filaments impregnated with a stabilizable resin are supplied to the mold and, finally, the antiabrasion material of the upper faces is applied. The mold is wound on a mandrel and the plastic material is stabilized before removing the mold sections which form a unitary assembly dividable particularly during the stranding of arm rings.

18 Claims, 3 Drawing Sheets

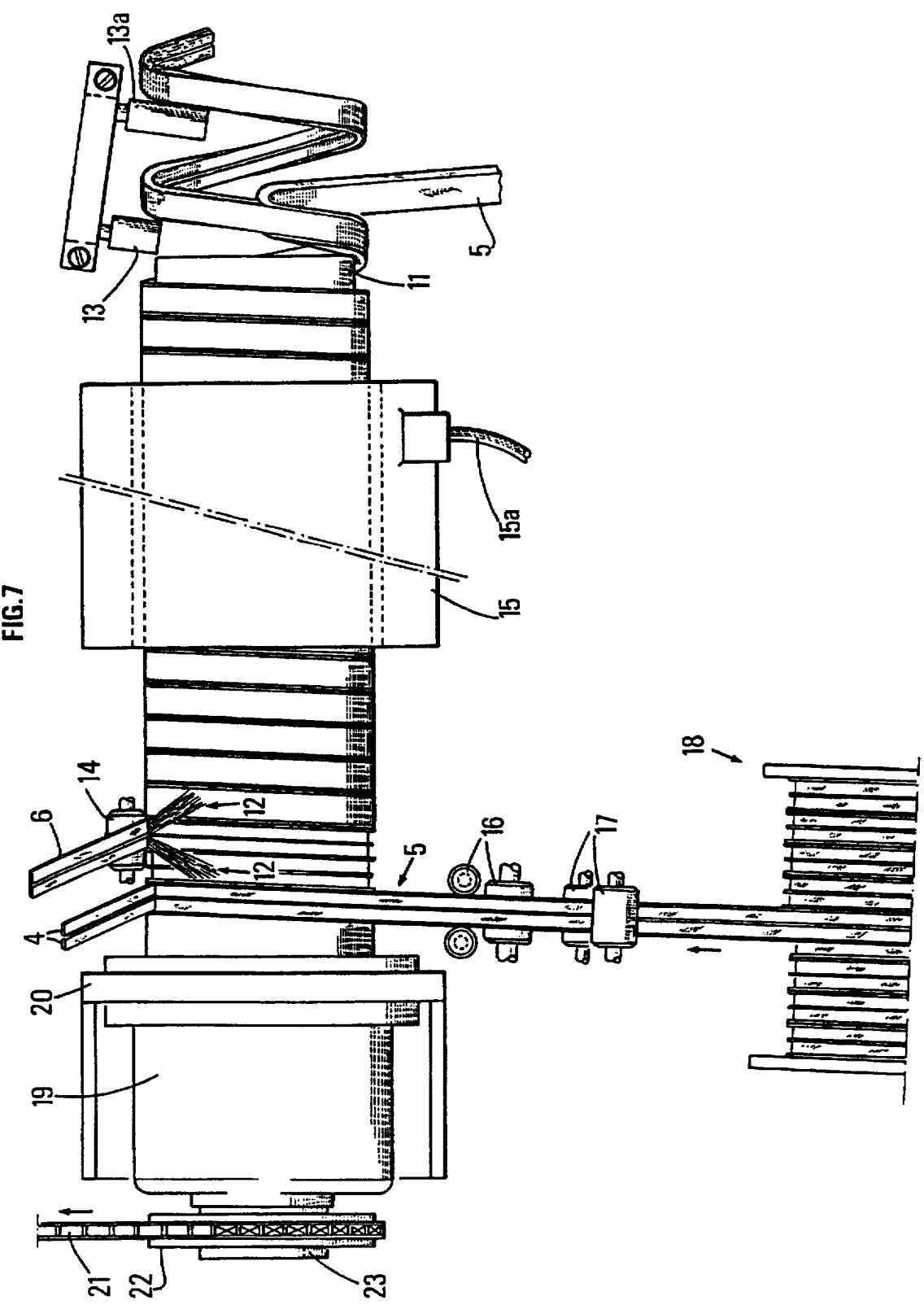

ANTIABRASION CURVED SHAPE AND PROCESS FOR ITS MANUFACTURE

This is a divisional of application Ser. No. 07/773,412, filed Oct. 9, 1991, now U.S. Pat. No. 5,389,424, which is a continuation application of Ser. No. 07/144,915, filed Mar. 3, 1988, now abandoned, which is a 371 of PCT/FR87/00113, filed Apr. 3, 1987.

BACKGROUND OF THE INVENTION

The present invention relates to an elongated body made of reinforced plastic capable of resisting abrasion, and a process for its manufacture.

DESCRIPTION OF THE PRIOR ART

Such shaped bodies are usable, particularly but not exclusively, to manufacture highly resistant lightweight tubing by helical winding of the shapes. Tubes of this kind assembled in this fashion are described, for example, in U.S. Pat. No. 4,013,100.

It has already been proposed, for example, in French Patent 2,312,356 to make a shape of reinforced plastic by using a mixture of filaments and cross-linkable plastic to fill an elongated groove forming a mold, wound on the wall of a drum, with the shape being extracted from this groove after heat treatment.

During tests of bending fatigue of elements manufactured with shapes of this type, significant abrasion of the several layers thus formed has been observed, with the abrasion being capable of leading to premature failure of the tube.

French Patent 2,494,401 has already proposed a body of an elongated shape of reinforced plastic capable of resisting abrasion on at least three of its surfaces, and a process for manufacturing the elongated shaped body. However, the proposed shape is quite expensive, first because of the antiabrasion materials which it uses (quantity X unit price) and also because of the manufacturing cost. The latter increases as the width of the shapes decreases (dimension of the cross section of the shape along a perpendicular to the radius, with the height being the dimension along the radius) because the output of covering surface (composed of shapes) by the production machinery becomes smaller by the same proportion (covering surface output=rate of output of length multiplied by width of shape).

SUMMARY OF THE INVENTION

The present invention proposes a shape which is resistant to abrasion and a process for manufacturing the latter which overcomes the disadvantages of French Patent 2,494,401 cited above.

During fatigue testing of flexible tubing comprising several reinforcing sheets, it has been found that wear is irregularly distributed over the surfaces in question of the shape and that in all types of tubes and service configurations observed, the wear on the lower surfaces (internal surface of the shape) and upper surfaces (outer surface of the shape) is extremely severe and poses a serious danger to the tubing, while the wear on the side surfaces has no serious effects in the very long term.

The wear on the lower and upper surfaces corresponds to the contact zones where the effect of a high sliding speed is added to that of a high degree of friction, linked to a high contact force between the upper surfaces of the shaped bodies of a first sheet and the lower surfaces of the shaped bodies of a second sheet in contact with the first at said faces.

To overcome this damage to the surfaces, a suitably selected antiabrasion material can be placed between them and also, for reasons of stability of the latter, it can easily be rendered integral with one or the other of the surfaces. Thus, by using only a single layer of antiabrasion material, the quantity of the latter is reduced to a minimum and because of its high cost and the maximum reduction is achieved in the cost of abrasion-resistant shaped bodies.

According to an especially economical manufacturing process, the present invention proposes to create abrasion-resistant shapes by making the antiabrasion material integral with the upper surfaces of the shaped bodies and simultaneously producing several shapes.

The present invention, in addition to the economic advantages which it confers, makes it possible to facilitate the installation of shaped bodies when winding reinforced tubing and cables, particularly those which comprise a large number of shaped bodies per reinforcing sheet.

In addition to the same advantages as outlined above, the present invention also offers the possibility of manufacturing shaped bodies which comprise an antiabrasion material which is on both the lower surface and the upper surface.

The process makes it possible, especially for tubing comprising three superimposed sheets of shapes, to limit the number of abrasion-resistant shapes. By using shapes to form the central sheet which are resistant to abrasion on both their lower and upper surfaces, it is sometimes useless to use abrasion-resistant shapes to produce the extreme sheets.

This process for manufacturing an elongated body of reinforced material with the elongated body being capable of resisting abrasion and comprising a lower and an upper surface utilizes an elongated groove forming a mold which is filled with the reinforced material, it is especially characterized by the fact that before the groove is filled with the reinforced material, a first layer of antiabrasion material is placed on the bottom and/or walls of the groove and/or after having lined the groove with the reinforced material, it is covered with a second layer of antiabrasion material, and characterized by the fact that after having carried out one and/or the other of the preceding steps, the groove is separated from the reinforced material comprising the layer or layers of antiabrasion material.

When the reinforced material is a mixture of stabilizable plastic and high-resistance filaments, the first layer of antiabrasion material can be applied before proceeding to the treatment that permits the shape of the stabilizable material to be stabilized.

To manufacture curved elongated bodies using a hollow shaped mold, said elongated bodies could be shaped in the hollow shape arranged in a helix on a mandrel, and after forming said elongated body comprising the layer or layers of antiabrasion material, they could be separated from the hollow shape.

The mold could comprise several essentially parallel grooves, making it possible to produce several abrasion-resistant bodies simultaneously.

The layer or layers of antiabrasion material could be in the form of a strip.

All the upper surfaces of the elongated bodies could be covered simultaneously to protect them against abrasion, using a single strip of antiabrasion material.

The strip could include a restriction zone between each elongated body.

After having separated the shape which forms the mold for the shaped elongated bodies covered by the antiabrasion strip, said strip could be divided longitudinally between the elongated bodies to produce simultaneously several shaped elongated abrasion-resistant bodies.

The shaped bodies could be separated from one another during the use of the reinforced body, with the reinforced body comprising the shaped bodies.

The invention also provides a shaped body obtained by working the process.

The invention also provides a curved elongated abrasion-resistant body, specifically characterized by the fact that the upper surface and/or the lower surface of the elongated body is/are resistant to abrasion and by the fact that one part at most of the lateral surfaces of the body is resistant to abrasion.

The internal walls of the mold could be lined with an antiadhesive product before adding the filaments of cross-linkable material.

The elongated body could comprise an antiabrasion material only on its upper surface and/or lower surface.

The invention also provides for a strip having at least one surface and grouping the parallel elongated bodies with the bodies having to be used simultaneously. This strip is characterized by each of the elongated bodies comprising a surface which is integral with a part of the surface of the strip and characterized by the fact that in the course of the utilization of the elongated bodies, said strip is designed so that the elongated bodies acquire a relative freedom of movement between them.

BRIEF DESCRIPTION OF THE DRAWINGS

The invention is illustrated by the attached drawings wherein:

FIG. 7 is a schematic diagram of a process according to the invention for manufacturing shapes that are resistant to abrasion on their lower and upper surfaces;

DESCRIPTION OF THE PREFERRED EMBODIMENTS

Figure 1:
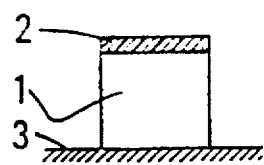
FIG. 1 is a cross section through a shape according to the invention with an antiabrasive protection on its upper surface and resting on a reinforcing sheet inside a reinforced pipe.

In FIG. 1, shaped body 1 is covered on its upper surface by an antiabrasion material 2, with a shaped body resting in service on part 3 which can be either a reinforcing armature of an internal sheet or a sealing lining for a flexible pipe.

Figure 2:
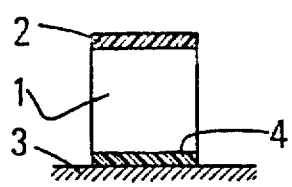
FIG. 2 shows in detail a shape according to the invention comprising an antiabrasion protection on its lower and upper surfaces.

As shown in FIG. 2, shaped body 1 can comprise not only protection for its upper surface, provided by an antiabrasion material which protects both the shape itself and possibly the shapes of the upper reinforcing sheet, but also protection against abrasion of its lower surface with the aid of an antiabrasion material which, as in the case of the upper surface, simultaneously protects the shape and possibly the shapes of the internal reinforcing sheet.

Figure 3:
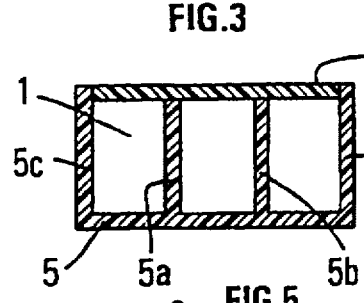
FIG. 3 shows a shaping mold according to the invention during the production of shapes resistant to abrasion on their upper parts.
Figure 4:
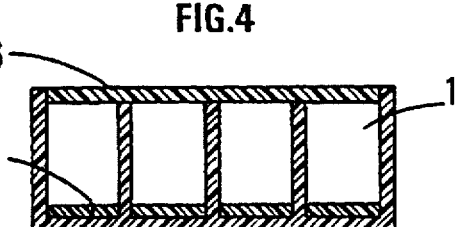
FIG. 4 shows a shaping mold according to the invention during the manufacture of shapes resistant to abrasion on their lower and upper surfaces.
Figure 5:
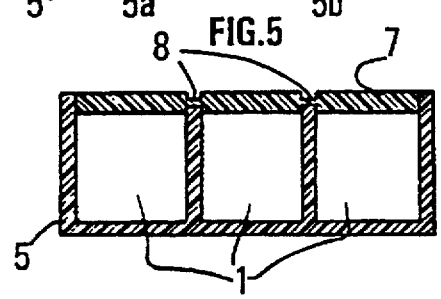
FIG. 5 shows in detail the molding of the shapes connected by an antiabrasion strip comprising restriction zones between each shaped body.

While FIGS. 1 and 2 show the shaped body equipped with its antiabrasive protection or protections after manufacture, FIGS. 3, 4 and 5 show various embodiments of these shapes according to the invention.

According to the invention, several abrasion-resistant shaped bodies 1 are produced simultaneously in a multi-groove shaped mold 5 which can be made, for example, of polyamide.

In FIG. 3, the antiabrasion material consists of a strip of antiabrasion material 6 which can be a plastic embedded in external walls 5C and 5D of the mold 5 up to the level of its internal walls 5A and 5B and which simultaneously cover all the shapes.

The ends of the exterior vertical walls of the mold 5 or the external walls are designed here to facilitate centering the strip 6 in the mold.

The strip is designed to become integral with each of the shaped bodies and not to stick to the mold 5. This integration can be accomplished by sticking or mechanical anchoring.

On the other hand, the mold is designed to facilitate removing shaped bodies 1, connected together by strip 6, from the mold.

For this purpose, the grooves in the mold 5 could be lined with antiadhesion products such as a mold removal agent of a type currently used in the plastics industry before lining these grooves with filaments and a stabilizable plastic.

The term stabilizable material refers to the bodies which can assume a stable form by a physical or chemical process such as melting with cooling or cross-linking. These materials can be thermoplastic, thermosetting, or elastomeric for example.

It is also possible to use as a mold removal agent sheets of antiadhesion plastic at least on one of their surfaces and placed inside the mold 5.

As is illustrated in FIG. 4 on the bottom of each of the grooves in mold 5 there is an antiabrasion material 4 which constitutes the anti-wear protection for the bottom surface of the shaped bodies. In each groove the antiabrasion material 4 is covered with reinforcing filaments impregnated with resin using means adapted for integrating the antiabrasion material. The upper surface of each of the shapes is then covered with a strip of antiabrasion material 6 which adheres to the upper surfaces.

FIG. 4 shows the arrangement in a mold of different materials when making shaped bodies resistant to abrasion on both their lower and upper surfaces.

FIG. 5 shows a preferred embodiment in which an antiabrasion strip of adjustable thickness 7 is used, comprising free restrictions 8 located above the internal walls of mold 5. This strip is made integral with shaped bodies 1 as described above. The restrictions 8 extend in the direction of elongation of the strip made of antiabrasion material.

Essentially the goal of these restrictions is:

The strip must cover all the mold shapes.

All the shapes, once removed from the mold, will constitute a unit assembly which can be easily stored and handled.

The separation of the shapes must be carried out easily, either at the time of winding or during the service life of the tubing, cable, or reinforced body without thereby producing any harmful effects such as disintegration of the reinforcing sheet used for example in the reinforced tubing and cables and harming the arrangement of the reinforcing sheets.

The thickness of the strip at the level of the restrictions 8 can thus be very small (several hundredths of a millimeter, for example). The material at the level of the restrictions 8 can be either the antiabrasion material itself or another material.

Figure 6:
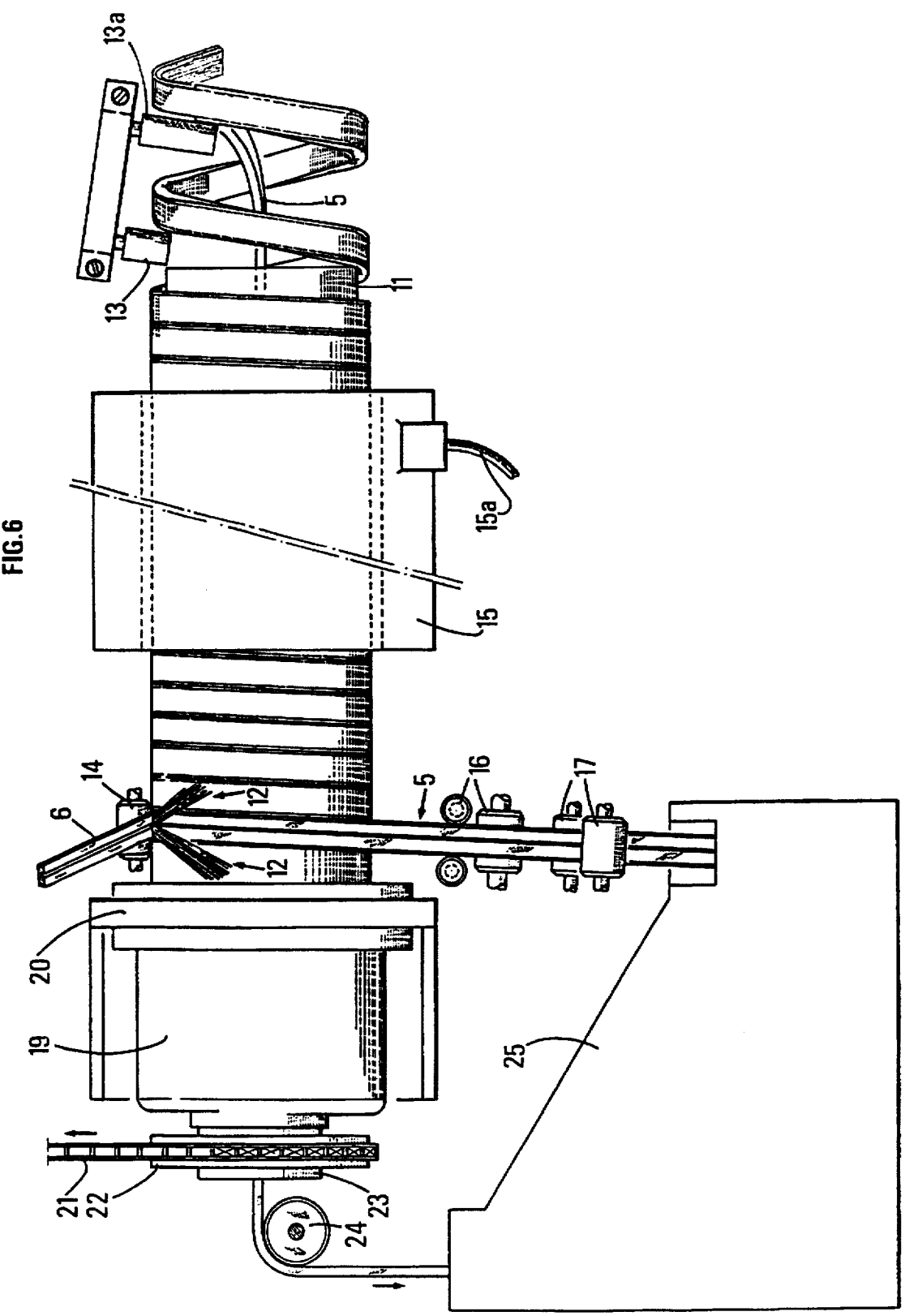
FIG. 6 is a schematic view of a process according to the invention for manufacturing shaped bodies and recycling the shaped mold.

In FIGS. 6 and 7, the multigroove mold 5 is used to manufacture shaped bodies and for adding the antiabrasion material. The largest surface of the mold rests on the mandrel or drum 11.

Shaft 23 of drum 11 is connected with drive means for rotating this drum, comprising for example a chain 21 engaging a toothed pinion 22 mounted on shaft 23.

Shaft 23 rests on bearing 19 through rollers, with this bearing being integral with a frame 20.

Before being wound on mandrel 11, the shaped mold 5 passes between guide rollers 16 and tension rollers 17.

In FIG. 6, mold 5 has several longitudinal grooves which, as drum 11 is wound, are filled with high-resistance filaments 12 or rovings, previously impregnated with a stabilizable plastic which will not stick to the inside walls of the grooves and is capable of adhering to the filaments. The mixture of filaments and stabilizable material form the shaped body 1.

The lined mold is then covered with antiabrasion material 6, capable of adhering to the upper surfaces of the shaped bodies, for example either by adhesion or by mechanical anchoring.

The antiabrasion material 6 can be in the shape of a strip as shown in FIG. 6 or can be composed of several strips. It is also possible to use a pressure roller 14 to facilitate assembly.

A slight pull on antiabrasion material 6 can likewise insure the fitting of the strip into the mold by the capstan effect.

A countermold, as described in French Patent 2,312,356 can be used before applying element 6 for a suitable distribution of the filaments in the grooves of the mold.

In FIG. 7, mold 5 has several longitudinal grooves which as drum 11 is wound, are first each filled with an antiabrasion material 6 which can be in the form of a strip and then receive high-resistance filaments 12, previously impregnated with resin which will not stick to the inside walls of the grooves, but which can adhere to said filaments and antiabrasion material. These resin impregnated filaments 12 are then covered with an antiabrasion material 6 capable of adhering to the filaments. The antiabrasion material 6 can be in the form of a strip, as shown in FIG. 7, or can be composed of several strips.

As shown in FIG. 6, a pressure roller 14 can be used or a capstan effect can be produced with the strip of antiabrasion material 6.

The shaped mold 5 can be lined easily either at several points on the same generatrix of the mandrel as shown in FIG. 7 or at several points on different generatrices of the mandrel.

In FIGS. 6 and 7, the shaped mold 5 after filling then passes into a furnace 15 where it is subjected to heat treatment capable of conferring a stable form on the reinforced plastic material which it contains and possibly making it integral with the antiabrasion material or materials of the resin-impregnated filaments.

Furnace 15 is supplied with energy by any appropriate means such as, for example, cable 15a if electrical heating means are used.

In FIG. 7, reference 18 designates a supply reel of the shaped mold 5 which, during passing between guide rollers 16 and tension rollers 17, is filled with said filaments 12.

Following stabilization, as shown in FIGS. 6 and 7, the shaped bodies covered with antiabrasion material can be extracted from shaped mold 5 where they have been formed.

This extraction process is performed, for example, at a point located outside the mandrel by curving mold 5 using rollers 13 and 13a toward the axis of the mandrel.

Depending on whether mold 5 is or is not to be continuously recycled inside or outside the mandrel, as shown in FIG. 6, the mold can be passed into mandrel 11 and then into shaft 23 toward the left of the drawing and over return roller 24 (mandrel 11 and shaft 23 will both have been drilled out), or as shown in FIG. 7, the multigroove mold can be caused to emerge between the groups of shaped bodies formed and possibly recycled inside of reel 18.

The mold can then either be stored or continuously reused after passing through a mold-cleaning device 25 using a suitable means.

The released shaped bodies are then transported to storage or use locations.

Figure 8:
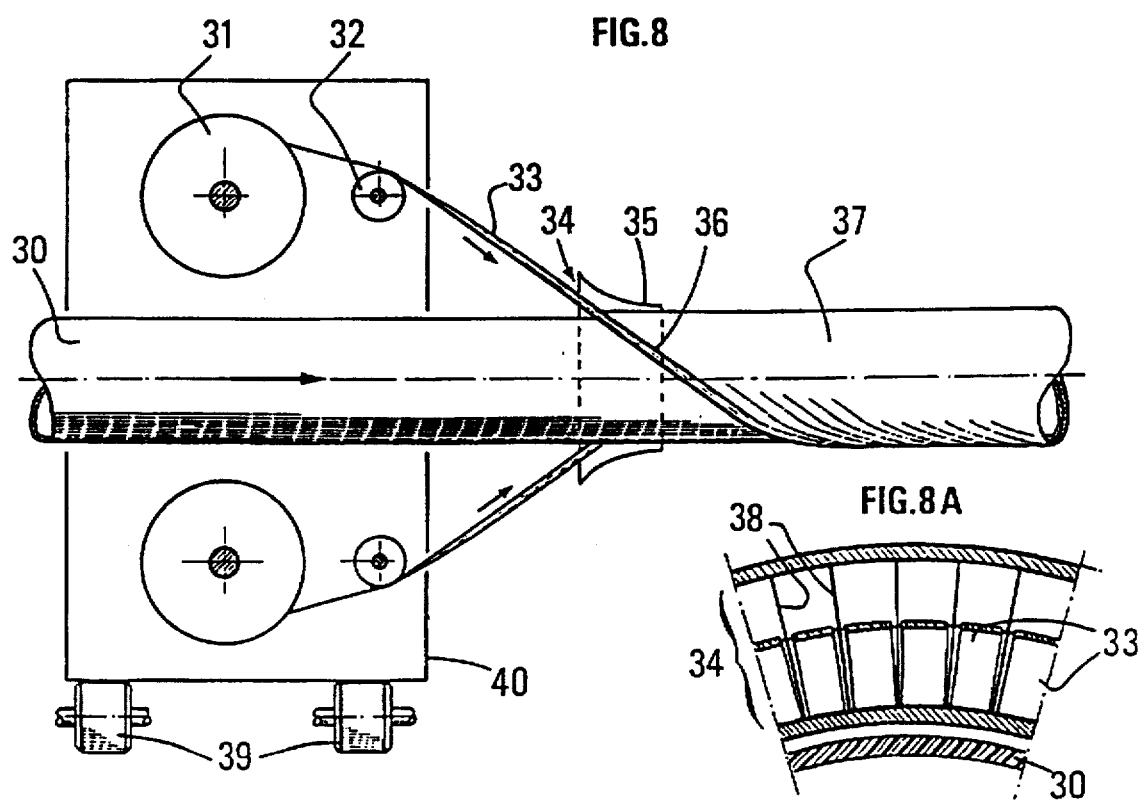
FIG. 8 is a schematic diagram of a process for winding using an integral assembly according to the invention.

FIG. 8 is a schematic diagram showing the winding of a reinforcing sheet on a cylindrical body made with the abrasion-resistant shaped bodies. These shaped bodies 1 are connected together by their upper parts using a strip 6 as shown in FIGS. 3, 4 and 5 and form unit assembly 33.

This unit assembly 33 is initially stored on one or more reels 31. This reel or reels 31 can be braked for example by appropriate means so that the shapes are stretched before being installed.

This method of stretching the shapes can be accomplished in a different way without disadvantage.

The unit assembly goes around a directional roller 32 intended to preserve the angle of application of assembly 33 on core 30.

The unit assembly is then divided by cutting between the shapes before entering die 35 and forming the applied strand 36 of sheet 37 during application. If the application is correct without the die, the latter can be removed.

The assembly can be divided, for example, by heat cutting, mechanical cutting, laser cutting, or cutting using water under pressure.

Figure 8A:
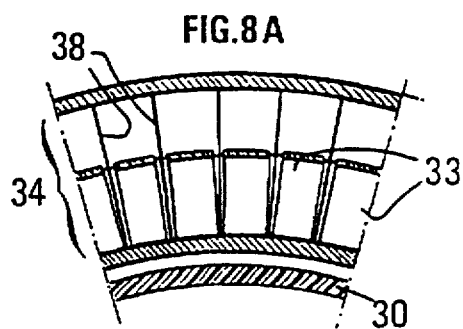
FIG. 8A is a schematic diagram of the grid used for separating and arranging the shapes used for winding reinforced tubing.

In FIG. 8, or as shown in detail in FIG. 8A, the cut may be made mechanically using separators 38 of grid 34. Grid 34 and possibly die 35 follow the rotation of the shapes around core 30.

Grid 34 is synchronized in rotation with cage 40 by an appropriate means such as an integrating device or an auxiliary return shaft.

The shapes as they pass through grid 34 can also provide its rotational drive.

Grid 34, like die 35, is generally translationally fixed with respect to the axis of core 30.

The cut made in the strip can be narrow or wide depending on the configuration of the sheet and the mutual risks of stripping the antiabrasion protection off the tube shapes which touch at the level of their upper protection.

Depending on the diameter of core 30, the angle of application, and the type of shape, it may be necessary in certain cases to cut the unit assembly at right angles to each of the side faces of each of the shapes comprising the assembly.

In the method for winding a reinforcing sheet shown in FIG. 8, it is assumed that core 30 is driven with translation toward the right of the figure and is kept from rotating while cage 40, reel support 21 and rollers 32 are immobile translation-wise but rotate around core 30 in the direction that allows core 30 to be covered.

All the combinations of mobility of core 30 and cage 40 are possible, since the relative movement of one relative to the other constitutes a threading action (to the right or left depending on the case).

In FIG. 8, the cage 40 is held by cage rollers 39. In the processes for manufacturing abrasion-resistant shaped bodies which have been discussed so far, a multigroove mold is used preferentially but it is possible to make all the shapes either one by one in a single groove and on a single mandrel or to make several at once in several molds and on a single mandrel, with the latter possibility being of interest when the effort required for removal from the mold causes unacceptable deformations of the mold.

The antiabrasion material 6 used to provide the antiabrasion protection for the shape can be composed, for example, of thermoplastic material such as polyamide, thermosettable materials or elastomers properly formulated for resistance to abrasion, solid lubricants or other means of combatting wear associated with the shaped body.

The present invention permits the antiabrasion protection to be provided by physical or chemical treatment of the surface or surfaces of the shaped body.

If the antiabrasion protection is polyamide 11 and the shaped body is reinforced with fiberglass impregnated with epoxy resin, it is possible, for example, to use SCOTCH-WELD 2216 B/A (registered trademark of Minnesota Mining and Manufacturing Company) epoxy adhesive to join the Antiabrasion protection and the shaped body.

In the case, for example, where the shaped bodies comprise two antiabrasion protections, one (e.g. element 4 in FIG. 4) on the lower surface and the other (e.g. element 6 in FIG. 4) on the upper surface, it is quite possible for the antiabrasion materials to be different on the two surfaces and for them to be designed so that together they produce a frictional pair of antiabrasion materials which can be put to good use when there are contacts between the internal and the external reinforcing sheet.

In the description of the present invention the shapes are composed of thermosetting material reinforced with glass filaments, carbon filaments, or filaments of other materials with considerable resistance to tractive effort. It would not be going beyond the scope of the present invention to apply the proposal of the present invention by using metal reinforcing bars possessing antiabrasion qualities, for example, only on their lower and/or upper faces.

In general, the elongated bodies can include any moldable and/or stabilizable and/or reinforced material.

It is claimed:

1. A strip having a longitudinal axis joining at least two elongated bodies each having a longitudinal axis and arranged in parallel with said elongated bodies being used simultaneously wherein:

each of said elongated bodies comprises a surface which is integral with a portion of a surface of said strip, and wherein each of said elongated bodies when integral with said strip has a relative freedom of movement with respect to at least one other of said elongated bodies when said strip is flexed, the longitudinal axes of the strip and the at least two elongated bodies being parallel and the strip being formed from a material different than a material from which the elongated bodies are formed.

2. A curved elongated construction comprising:

a strip having a longitudinal axis, said strip joining at least two elongated bodies each having a longitudinal axis with the longitudinal axes of the strip and the at least two elongated bodies being arranged in parallel with said elongated bodies being used simultaneously and each of said elongated bodies having a surface which is integral with a portion of a surface of said strip and wherein each of said elongated bodies when integral with said strip has a relative freedom of movement with respect to at least one other of said elongated bodies when said strip is flexed and the strip being formed from a material different than a material from which the elongated bodies are formed.

3. A process for manufacturing an elongated construction of reinforced material with said elongated construction being capable of resisting abrasion and having a strip having a longitudinal axis and including a lower surface and an upper surface comprising:

joining at least two elongated bodies with each of the at least two elongated bodies having a longitudinal axis with each of the longitudinal axes of the strip and the at least two elongated bodies being arranged in parallel with each of the elongated bodies comprising a surface which is integral with a portion of one of the upper and lower surfaces of the strip and wherein each of said elongated bodies when integral with said strip has a relative freedom of movement with respect to at least one other of said elongated bodies and the strip being formed from a material different than a material from which the elongated bodies are formed.

4. A strip in accordance with claim 1 wherein:

the strip is an antiabrasion material.

5. A strip in accordance with claim 4 wherein:

the antiabrasion material is a thermoplastic.

6. A strip in accordance with claim 1 wherein:

the at least two elongated bodies are formed from a material selected from the group consisting of thermoplastics, thermosets, and elastomers.

7. A strip in accordance with claim 4 wherein:

the at least two elongated bodies are formed from a material selected from the group consisting of thermoplastics, thermosets, and elastomers.

8. A strip in accordance with claim 5 wherein:

the at least two elongated bodies are formed from a material selected from the group consisting of thermoplastics, thermosets, and elastomers.

9. A curved elongated construction in accordance with claim 2 wherein:

the strip is an antiabrasion material.

10. A curved elongated construction in accordance with claim 9 wherein:

the antiabrasion material is a thermoplastic.

11. A curved elongated construction in accordance with claim 2 wherein:

the elongated bodies are formed from a material selected from the group consisting of thermoplastics, thermosets, and elastomers.

12. A curved elongated construction in accordance with claim 9 wherein:

the elongated bodies are formed from a material selected from the group consisting of thermoplastics, thermosets, and elastomers.

13. A curved elongated construction in accordance with claim 10 wherein:

the elongated bodies are formed from a material selected from the group consisting of thermoplastics, thermosets, and elastomers.

14. A process in accordance with claim 3 wherein:

the strip is an antiabrasion material.

15. A process in accordance with claim 14 wherein:

the antiabrasion material is a thermoplastic.

16. A process in accordance with claim 3 wherein:

the elongated bodies are formed from a material selected from the group consisting of thermoplastics, thermosets, and elastomers.

17. A process in accordance with claim 14 wherein:

the elongated bodies are formed from a material selected from the group consisting of thermoplastics, thermosets, and elastomers.

18. A process in accordance with claim 15 wherein:

the elongated bodies are formed from a material selected from the group consisting of thermoplastics, thermosets, and elastomers.

* * * * *